United States Patent [19]
Ishibashi et al.

[11] Patent Number: 5,278,226
[45] Date of Patent: Jan. 11, 1994

[54] STABLE POLYMER DISPERSIONS IN POLYOXYALKYLENEPOLYAMINE

[75] Inventors: Hideo Ishibashi, Neyagawa; Toshiyuki Oshima, Ibaraki; Rie Tamura, Toyonaka; Satoshi Yamamoto, Hirakata; Takaharu Izumo, Osaka, all of Japan

[73] Assignee: Nippon Paint Co., Ltd., Osaka, Japan

[21] Appl. No.: 917,396

[22] Filed: Jul. 23, 1992

[30] Foreign Application Priority Data

Jul. 23, 1991 [JP] Japan ................................. 3-207388

[51] Int. Cl.$^5$ .......................... C08F 2/00; C08K 5/06; C08K 5/16; C08K 5/17
[52] U.S. Cl. ................... 524/714; 524/724; 526/209
[58] Field of Search ............... 524/714, 724, 457, 833; 526/209

[56] References Cited

U.S. PATENT DOCUMENTS

| | | | |
|---|---|---|---|
| 4,286,074 | 8/1981 | Davis et al. | 525/412 X |
| 4,522,976 | 6/1985 | Grace et al. | 524/724 X |
| 4,689,366 | 8/1987 | Hoefer | 524/833 X |
| 4,771,100 | 9/1988 | Das et al. | 524/724 X |
| 5,126,392 | 6/1992 | Nahashima et al. | 524/833 X |
| 5,128,406 | 7/1992 | Padget et al. | 524/724 |
| 5,171,772 | 12/1992 | Hoy et al. | 524/833 X |

Primary Examiner—Judy M. Reddick
Attorney, Agent, or Firm—Townsend & Banta

[57] ABSTRACT

A stable polymer dispersion in polyoxyalkylenepolyamine is provided by the in situ polymerization of at two different monomers selected respectively from (a) a first monomer capable of forming a homopolymer which does not precipitate out upon the in situ polymerization and (b) a second monomer capable of forming a homopolymer which precipitates out upon the in situ polymerization. The dispersion is useful as a raw materials of polyurea RIM, forms, elastomers and other products.

11 Claims, No Drawings

STABLE POLYMER DISPERSIONS IN POLYOXYALKYLENEPOLYAMINE

BACKGROUND OF THE INVENTION

This invention relates to a stable polymer dispersion in which the polymer constitutes the dispersed phase and a polyoxyalkylenepolyamine constitutes the continuous phase for use in polyurea reaction injection molding (RIM) or in the manufacture of polyurea foams, elastomers and the like.

Graft polymer dispersions in polyetherpolyol prepared by the in situ polymerization of ethylenically unsaturated monomers in the polyetherpolyol are known as a raw material of polyurethanes. See, U.S. Pat. Nos. 3,652,659; 3,875,258; 3,950,317; U.S. Pat. No. Re. 28,715 and U.S. Pat. No. Re. 29,014.

U.S. Pat. No. 4,286,074 to Davis et al. discloses a graft polymer dispersion in an amine-terminated polyoxyalkylene polyol, i.e. polyoxyalkylenepolyamine prepared by the in situ polymerization of ethylenically unsaturated monomer or monomers in the polyoxyalkylenepolyamine. The resulting graft polymer dispersion may be used in conjunction with conventional polyetherpolyol for the production of polyurethane products having improved mechanical properties.

Japanese Laid Open Patent Application (Kokai) No. 145711/83 corresponding to DOS 3200021 discloses a similar graft polymer dispersion in which the continuous phase is an aromatic amine-terminated polyetherpolyol which is prepared, in turn, by hydrolyzing a corresponding aromatic isocyanate-terminated polyether. This product is also useful as a raw material of polyurethane foams and the like.

It is postulated that the polymer grafted polyetherpolyol or polyoxyalkylenepolyamine forming the continuous phase in the prior art dispersions functions as a co-solubilizing agent which prevents the phase separation, fusion or solidification of polymer particles forming the dispersed phase. In contrast, a corresponding polymer separately produced by the solution polymerization will no longer make a stable dispersion in the polyetherpolyol or polyoxyalkylenepolyamine because they are not co-soluble in one another.

Although the above-cited U.S. Pat. No. 4,286,074 teaches that a wide variety of monomers are usable in the in situ polymerization method to produce a stable dispersion, only styrene, acrylonitrile and mixtures thereof have been actually tested.

It has been discovered that when performing the in situ polymerization in the polyoxyalkylenepolyamine, some ethylenically unsaturated monomers will produce a solid or semi-solid polymer mass which is no longer dispersible or miscible with the polyoxyalkylenepolyamine.

It is, therefore, a principal object of this invention to provide a stable dispersion of a wide variety of polymers in a polyoxyalkylenepolyamine liquid which does not undergo irreversible phase separation of dispersed polymer particles.

Other objects and advantages of the present invention will become apparent to those skilled in the art as the description proceeds.

SUMMARY OF THE INVENTION

According to the present invention, a stable polymer dispersion having homogeneously dispersed therein 5 to 80% by weight of the dispersion of a polymer prepared by the in situ polymerization of at least two different monomers in polyoxyalkylenepolyamine in the presence of a polymerization initiator is provided. Said monomer combination includes (a) a first ethylenically unsaturated monomer capable of producing a homopolymer which does not precipitate out upon said in situ polymerization, and (b) a second ethylenically unsaturated monomer capable of producing a homopolymer which precipitates out upon said in situ polymerization.

Specifically, said first monomer (a) is an acrylic monomer of the formula: $CH_2=CH-Y$, wherein Y is a functional group, and is capable of producing a homopolymer having a solubility parameter ranging between 9.2 and 10.5. Said second monomer is an acrylic monomer of the formula: $CH_2=CH-Y'$, wherein $Y'$ is a functional group other than Y, and is capable of forming a homopolymer having a solubility parameter less than 9.2 or greater than 10.5. The second monomer may simply be a methacrylic monomer of the formula: $CH=C(CH_3)-Y''$, wherein $Y''$ is a functional group.

By utilizing the first monomer (a) in combination with the second monomer (b) the in situ polymerization will produce a stable dispersion which does not suffer from phase separation of dispersed polymer particles.

DETAILED DISCUSSION

The polyoxyalkylenepolyamine used in this invention should have an average molecular weight greater than 400 and a plurality of terminal primary or secondary amino groups. The polyoxyalkylenepolyamine may be produced, for example, by catalytically hydrogenating a corresponding polyoxyalkylenepolyol in the presence of ammonia or a primary amine. See, Japanese Laid Open Patent Application (Kokai) Nos. 204225/86, 278528/86, 38425/89 and 127425/89. Alternatively, it may be produced by reacting the polyoxyalkylenepolyol with acrylonitrile to introduce cyanoethyl group to the terminals followed by reducing the cyanoethyl group to aminoethyl group as disclosed U.S. Pat. No. 3,496,138.

The polyoxyalkylenepolyol mentioned above can be obtained by subjecting an alkylene oxide to ring-opening polymerization using a basic catalyst, such as an alkali metal hydroxide, in the presence of an appropriate initiator. The starting initiator includes, inter alia, ethylene glycol, diethylene glycol, triethylene glycol and other polyethylene glycols, propylene glycol, dipropylene glycol, tripropylene glycol and other polypropylene glycols, glycerol, diglycerol, pentaerythritol, sorbitol, sucrose and other polyhydric alcohols, bisphenol A, bisphenol S, resol and other polyphenols, and various amines such as diethanolamine, triethanolamine and so on. As regards the alkylene oxide mentioned above, ethylene oxide, propylene oxide, butylene oxide, tetrahydrofuran, etc. can be used independently or in an optional combination. The average molecular weight range of polyoxyalkylenepolyol is 200 to 10,000 and preferable 400 to 8,000.

Many polyoxyalkylenepolyamines are commercially available. For example, Jeffamine D-2000 (Texaco Chemical, amine equivalent ca. 1000) is a polyoxypropylenediamine and Texrim TR-5050 (ditto, amine equivalent ca. 1930) and Jeffamine T-403 (ditto, amine equivalent ca. 160) are polyoxypropylenetriamines. All of such commercial polyoxyalkylenepolyamines can be used with advantage in this invention.

A variety of ethylenically unsaturated monomers are known and may be used in this invention. Examples thereof include acrylic acid, acrylic esters (e.g. methyl acrylate, ethyl acrylate, n-butyl acrylate, i-butyl acrylate, t-butyl acrylate, 2-ethylhexyl acrylate, lauryl acrylate, stearyl acrylate, ethylene glycol diacrylate, etc.), acrylamide, acrylonitrile, methacrylic acid, methacrylic esters (e.g. methyl methacrylate, ethyl methacrylate, n-butyl methacrylate, i-butyl methacrylate, t-butyl methacrylate, 2-ethylhexyl methacrylate, lauryl methacrylate, sterayl methacrylate, ethylene glycol dimethacrylate etc.), methacrylamide, methacrylonitrile, vinyl chloride, vinylidene chloride, styrene, α-methylstyrene, divinylbenzene, ethyl vinyl ketone, ethyl vinyl sulfone, vinylsulfonic acid and so on.

As mentioned before, not all monomers can form a homopolymer which does not undergo phase separation in the dispersion produced by the in situ polymerization in the polyalkylenepolyamine. Namely, only those homopolymers having a solubility parameter ranging between 9.2 and 10.5 do not precipitate out. The solubility parameter at 25° C. of a given homopolymer may be estimated according to the equation:

$$\delta = \left[ \sum_i \Delta e_i / \sum_i \Delta v_i \right]^{\frac{1}{2}}$$

wherein $\Delta e_i$ and $\Delta v_i$ are the atomic and group contribution for the energy of vaporization and molar volume respectively, as proposed in Robert F. Fedors, Polymer Engineering And Science, 14 (2), 147 (1974). Using this equation, the solubility parameter of a substance of known structure may be estimated substituting known values of $\Delta e_i$ and $\Delta v_i$ of particular atom or group for the $\Delta e_i$ and $\Delta v_i$ of the above equation without need for knowing the molecular weight and density of the substance.

The table below shows solubility parameters (SP) estimated by this method for typical acrylic homopolymers.

| Homopolymer | SP | Precipitation in TEXRIM TR-5050 |
|---|---|---|
| Poly(acrylamide) | 17.19 | Yes |
| Poly(2-hydroxyethyl acrylate) | 13.31 | " |
| Poly(acrylonitrile) | 13.11 | " |
| Poly(2-hydroxypropyl acrylate) | 12.44 | " |
| Poly(methyl acrylate) | 10.58 | " |
| Poly(methoxymethyl acrylate) | 10.43 | No |
| Poly(ethyl acrylate) | 10.20 | " |
| Poly(methoxyethyl acrylate) | 10.16 | " |
| Poly(n-propyl acrylate) | 9.95 | " |
| Poly(n-butyl acrylate) | 9.77 | " |
| Poly(ethoxyethyl acrylate) | 9.96 | No |
| Poly(i-propyl acrylate) | 9.72 | " |
| Poly(i-butyl acrylate) | 9.57 | " |
| Poly(amyl acrylate) | 9.63 | " |
| Poly(n-hexyl acrylate) | 9.52 | " |
| Poly(n-heptyl acrylate) | 9.43 | " |
| Poly(n-octyl arcylate) | 9.35 | " |
| Poly(n-nonyl acrylate) | 9.29 | " |
| Poly(methoxytripropylene glycol acrylate) | 9.26 | " |
| Poly(n-decyl acrylate) | 9.24 | " |
| Poly(2-ethylhexyl acrylate) | 9.22 | " |
| Poly(n-undecyl acrylate) | 9.19 | Yes |
| Poly(lauryl acrylate) | 9.15 | " |
| Poly(n-tridecyl acrylate) | 9.11 | " |
| Poly(t-butyl acrylate) | 9.05 | " |
| Poly(stearyl acrylate) | 8.88 | " |

Since the solubility parameter of polyoxyalkylenepolyamine ranges between 8.7 and 9.0 the stability of the dispersion of this invention is not fully explainable by the solubility parameter theory.

According to the present invention, the first monomer (a) is selected from acrylic monomers of the formula: $CH_2=CH-Y$, wherein Y is as defined, which are capable of giving a homopolymer whose solubility parameter $\delta$ ranges between 9.2 and 10.5. Preferably, the first monomer (a) occupies at least 20% of the aggregate weight of all monomers. The second monomer (b) is selected from acrylic monomers of the formula: $CH_2=CH-Y'$, wherein Y' is as defined, which form a homopolymer having a solubility parameter less than 9.2 or greater than 10.5. Methacrylic monomers of the formula: $CH_2=C(CH_3)-Y''$, wherein Y'' is as defined, may be used as the second monomer regardless of the solubility parameter of their homopolymers. Thus, the second monomer (b) may be used in the in situ polymerization in conjunction with the first monomer (a) to produce a stable dispersion although the use of the second monomer alone fails. The monomer combination may contain a monomer other than the first and second monomers, such as styrene, divinylbenzene, vinylidene chloride and the like. Monomers of this class may be used in admixture with the second monomer(b).

The polymerization initiator which may be employed in this invention includes the well-known peroxide or azo type free radical initiators. Examples of peroxide initiators include benzoyl peroxide, t-butyl peroxide, lauryl peroxide, t-butyl peroxyoctate, t-butyl peroxypivalate, dicyclohexyl peroxydicarbonate and the like. Examples of azo initiators include 2,2'-azobisisobutyronitrile, 2,2'-azobis(2-methylbutyronitrile), 1,1'-azobis (cyclohexane-1-carbonitrile), dimethyl 2,2'-azobis (isobutyrate), 2,2'-azobis(2,4,4-trimethylpentane) and the like. Any of these conventional initiators may advantageously used in the present invention.

The in situ polymerization may be performed in various manners. In the stepwise process, the polyoxyalkylenepolyamine is placed in a reacter and heated to a temperature from 80° C. to 120° C. To this is added the whole quantity of the first monomer (a) having dissolved therein the initiator either in one time or dropwise and allowed to react for a short length of time. Then, the whole quantity of the second monomer (b) free from the initiator is added in a similar fashion and the mixture allowed to undergo the in situ polymerization. The stepwise process may be carried out repeatedly using an aliquot of the first and second monomers in one cycle of alternating addition of monomers when the stability of the resulting dispersion is adversely affected by the addition of the whole quantities of monomers in one cycle of the alternating addition. Alternatively, the second monomer (b) free from the initiator may be added to the heated polyoxyalkylenepolyamine before the first monomer (a) containing the initiator is added thereto. It is also possible for some combination of monomers to add simultaneously using a premix containing the initiator.

Generally, the above reaction may be carried out in the absence of an organic solvent. However, when some difficulties are encountered in handling e.g. the monomer occurs as solid at the ambient temperature, the monomer may be added in molten state or as a solution in a suitable solvent.

After the reaction, the resulting dispersion may be used as such or after removing the solvent if used as a raw material of polyurea RIM or in the manufacture of polyurea foams, elastomers and other products.

The present invention enables to use a wide variety of monomers including those monomers which have not been usable in the prior art because of irreversible phase separation in the in situ polymerization in polyoxyalkylenepolyamine.

The dispersion of this invention is, therefore, stable for a long period of time upon storage or may be easily re-dispersible by stirring if phase separation occurred.

The following examples are given for illustrative purposes only and not intended to limit the scope of the invention thereto.

EXAMPLE 1

A 500 ml flask equipped with a stirrer, reflux condenser, drip funnel, thermometer and nitrogen gas tube was charged with 280.0 g of TEXRIM TR-5050 (trifunctional, amine equivalent 1930, average M.W. 5000) and heated to 80° C. in a water bath. To the flask was added in one time 36.0 g of n-butyl acrylate having dissolved therein 1.2 g of 2,2'-azobisisobutyronitrile and allowed to react at the same temperature for 5 minutes. Thereafter, a mixture of 75.6 g of lauryl acrylate and 8.4 g of neopentyl glycol dimethacrylate was added dropwise over 30 minutes and allowed to react for additional 3 hours at 80° C. The resulting dispersion was stable for 7 days without phase separation and easily re-dispersible to homogeneous state with stirring after phase separation. Other data are shown in Table 1.

EXAMPLE 2

The same flask as used in Example 1 was charged with 240.0 g of TEXRIM TR-5050 and heated to 80° C. To the flask was added in one time a 24.0 g aliquot of n-butyl acrylate containing 0.8 g of 2,2'-azobisisobutyronitrile and allowed to react for 5 minutes at 80° C. Thereafter, a 56.0 g aliquot of stearyl methacrylate was added dropwise over 30 minutes in molten state and allowed to react for additional 3 hours. This alternating addition cycle was repeated once more using another 24.0 aliquot of n-butyl acrylate and another 56.0 g aliquot of stearyl methacrylate. The resulting dispersion was stable for 8 days without phase separation and easily re-dispesible to homogeneous state with stirring after phase separation. Other data are shown in Table 1.

EXAMPLE 3

The same flask as used in Example 1 was charged with 280.0 g of TEXRIM TR-5050 and 84.0 g of stearyl methacrylate and heated to 80° C. To the flask was added 36.0 g of n-butyl acrylate having dissolved therein 1.2 g of 2,2'-azobisisobutyronitrile over 30 minutes and allowed to react for additional 3 hours at 80° C. The resulting dispersion was stable for 5 days without phase separation and easily re-dispersible to homogeneous state with stirring after phase separation. Other data are shown in Table 1.

EXAMPLE 4

The same flask as used in Example 1 was charged with 280.0 g of TEXRIM TR-5050 and heated to 80° C. To the flask was added dropwise a mixture consisting of 36.0 g of n-butyl acrylate, 84.0 g of stearyl methacrylate and 1.2 g of 2,2'-azobisisobutyronitrile over 30 minutes, and allowed to react at 80° C. for additional 3 hours. The resulting dispersion was stable for 5 days without phase separation and easily re-dispersible to homogeneous state after phase separation. Other data are shown in Table 1.

COMPARATIVE EXAMPLE 1

The same flask as used in Example 1 was charged with 280.0 g of TEXRIM TR-5050 and heated to 80° C. To the flask was added dropwise a mixture consisting of 108.0 g of lauryl acrylate, 12.0 g neopentyl glycol dimethacrylate and 1.2 g of 2,2'-azobisisobutyronitrile over 30 minutes, and allowed to react at 80° C. for additional 3 hours. The resulting dispersion was stable only for 24 hours without phase separation but re-dispersible to homogeneous state after phase separation.

COMPARATIVE EXAMPLE 2

The same flask as used in Example 1 was charged with 280.0 g of TEXRIM TR-5050 and heated to 80° C. To the flask was added dropwise 120.0 g of stearyl methacrylate in molten state having dissolved therein 1.2 g of 2,2'-azobisisobutyronitrile over 30 minutes and allowed to react at 80° C. for additional 3 hours. The resulting dispersion was separated into two layers within 10 minutes after preparation but not re-dispersible to homogeneous state.

COMPARATIVE EXAMPLE 3

The same flask as used in Example 1 was charged with 280.0 g of TEXRIM TR-5050 and heated to 80° C. To the flask was added in one time 36.0 g of 2-hydroxyethyl acrylate having dissolved therein 1.2 g of 2,2'-azobisisobutyronitrile and allowed to react for 5 minutes. Thereafter, 84.0 g of stearyl methacrylte in molten state was added dropwise over 30 minutes and allowed to react for additional 3 hours at 80° C. The resulting pasty dispersion was stable for 48 hours without phase separation but not re-dispersible to homogeneous state with stirring after phase separation.

TABLE 1

| | Ex. 1 | Ex. 2 | Ex. 3 | Ex. 4 | Comp. 1 | Comp. 2 | Comp. 3 |
|---|---|---|---|---|---|---|---|
| Wt. % polyoxyalkylene polyamine in the dispersion | 70.0 | 60.0 | 70.0 | 70.0 | 70.0 | 70.0 | 70.0 |
| Viscosity, CPS at 25° C. | 2900 | 3400 | 2800 | 2800 | 2500 | Not measurable | >10000 |
| Stable time without phase separation | 7 days | 8 days | 5 days | 5 days | 24 hr. | >10 min | 48 hr. |

What is claimed is:

1. A stable polymer dispersion having homogeneously dispersed therein 5 to 80% by weight of the dispersion of a polymer prepared by the in situ polymerization of a monomer combination comprising a first monomer and a second monomer in a polyoxyalkylenepolyamine in the presence of a polymerization initiator, said first monomer being an acrylate monomer whose homopolymer has a solubility parameter between 9.2 and 10.5, said second monomer being an acrylic monomer whose homopolymer has a solubility parameter less than 9.2 or greater than 10.5, or a methacrylic monomer, the proportion of said first monomer being at least 20% by weight of said monomer combination.

2. The stable polymer dispersion of claim 1, wherein said first monomer is selected from the group consisting of methoxymethyl acrylate, ethyl acrylate, methoxyethyl acrylate, n-propyl acrylate, n-butyl acrylate, ethoxyethyl acrylate, i-propyl acrylate, i-butyl acrylate, amyl acrylate, n-hexyl acrylate, n-heptyl acrylate, n-octyl acrylate, n-nonyl acrylate, methoxytripropyleneglycol 3. The stable polymer dispersion of claim 1, wherein said second acrylic monomer is selected from the group consisting of acrylamide, 2-hydroxyethyl acrylate, acrylonitrile, 2-hydroxypropyl acrylate, methyl acrylate, n-undecyl acrylate, lauryl acrylate, n-tridecyl acrylate, t-butyl acrylate and stearyl acrylate.

4. The stable polymer dispersion of claim 1, wherein said second monomer is a methacrylic monomer of the formula: $CH=C(CH_3)-Y''$, wherein $Y''$ is a functional group.

5. The stable polymer dispersion of claim 1, wherein said methacrylic monomer is methacrylic acid, methacrylamide, methacrylonitrile or a methacrylate.

6. The stable polymer dispersion of claim 1, wherein said polymer is present in said dispersion from 10 to 50% by weight of said dispersion.

7. The stable polymer dispersion of claim 1, wherein said in situ polymerization is carried out stepwise by polymerizing said first monomer in the first step, and then polymerizing said second monomer in the second step.

8. The stable polymer dispersion of claim 7, wherein said first step and said second step are repeated at least twice in alternate order.

9. The stable polymer dispersion of claim 1, wherein said in situ polymerization is carried out by a polymerizing said first and second monomers simultaneously.

10. The stable polymer dispersion of claim 9, wherein said simultaneous polymerization includes the step of adding a premix of said first and second monomers having dissolved therein said initiator to said polyoxyalkylenepolyamine.

11. The stable polymer dispersion of claim 9, wherein said simultaneous polymerization comprises the steps of adding said second monomer free from said initiator to said polyoxyalkylenepolyamine and then adding said first monomer containing said initiator thereto.

* * * * *